United States Patent
Wang et al.

(10) Patent No.: US 8,907,539 B2
(45) Date of Patent: Dec. 9, 2014

(54) RETAINING RING CONFIGURATION SYSTEM

(75) Inventors: Yu Wang, Cohoes, NY (US); Jordan Christopher Baker, Canajoharie, NY (US); John Matthew Sassatelli, Valley Falls, NY (US); John Thomas Sterle, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 707 days.

(21) Appl. No.: 13/218,841

(22) Filed: Aug. 26, 2011

(65) Prior Publication Data

US 2013/0049522 A1   Feb. 28, 2013

(51) Int. Cl.
*H02K 5/00* (2006.01)
*H02K 15/00* (2006.01)
*H02K 3/51* (2006.01)

(52) U.S. Cl.
CPC . *H02K 15/00* (2013.01); *H02K 3/51* (2013.01)
USPC .............................. 310/91; 310/260; 310/270

(58) Field of Classification Search
USPC .................................... 310/91, 260, 270, 271
See application file for complete search history.

(56) References Cited

U.S. PATENT DOCUMENTS

| | | | |
|---|---|---|---|
| 4,368,399 A | 1/1983 | Ying et al. | |
| 4,661,183 A | 4/1987 | Beard | |
| 5,752,427 A * | 5/1998 | Leutner | 91/497 |
| 7,526,853 B2 | 5/2009 | Schumacher et al. | |
| 7,735,211 B2 | 6/2010 | Schumacher et al. | |
| 2006/0108728 A1 | 5/2006 | Schumacher et al. | |
| 2008/0092374 A1* | 4/2008 | Fayewicz et al. | 29/729 |

FOREIGN PATENT DOCUMENTS

EP   0451065 A1   10/1991

OTHER PUBLICATIONS

Search Report for corresponding GB Application No. 1214503.3, dated Dec. 13, 2012.

* cited by examiner

*Primary Examiner* — Tran Nguyen
*Assistant Examiner* — Leda Pham
(74) *Attorney, Agent, or Firm* — Hoffman Warnick LLC; Ernest G. Cusick

(57) ABSTRACT

A retaining ring configuration system is disclosed. In one embodiment, the system includes a set of adjustment apparatuses configured to contact a portion of a generator rotor, each of the set of adjustment apparatuses including: a base member for contacting the portion of the generator rotor; an adjustment member for adjusting a position of the generator retaining ring relative to the generator rotor; and an actuation member coupled to the base member and operably attached to the adjustment member, the actuation member for actuating movement of the adjustment member to adjust the position of the generator retaining ring relative to the generator rotor.

14 Claims, 3 Drawing Sheets

RETAINING RING CONFIGURATION SYSTEM

BACKGROUND OF THE INVENTION

The subject matter disclosed herein relates to a retaining ring configuration system for a generator. Specifically, the subject matter disclosed herein relates a configuration system for a generator retaining ring. The system allows for installation and/or removal of a retaining ring about a portion of an electric generator.

Retaining rings are used in electric generators to retain electrically conductive coils bound around a generator rotor body in both ends. Configuring (e.g., installing) these retaining rings can present a number of challenges. For example, the size and shape of the rotor can make it difficult to properly align a retaining ring with the rotor. Additionally, the retaining ring is heated in order to "shrink-fit" the retaining ring over the rotor. The retaining ring cools within approximately 10-15 minutes from the time of heating, and as such, the time window in which the ring can be installed is relatively small.

Conventionally, a datum (or, definitive reference point) is established in order to limit one or more variables in the installation process. In some cases, human visual inspections are relied on for the alignment and concentricity. In other cases, floor plates and/or track systems are employed to limit movement of the rotor such that a retaining ring can be positioned over the rotor. However, these conventional approaches are either insufficient to provide quality alignment repeatable in the allotted time frame, or require facility modification and/or installation

BRIEF DESCRIPTION OF THE INVENTION

A retaining ring configuration system is disclosed. In one embodiment, the system includes a set of adjustment apparatuses configured to contact a portion of a generator rotor, each of the set of adjustment apparatuses including: a base member for contacting the portion of the generator rotor; an adjustment member for adjusting a position of the generator retaining ring relative to the generator rotor; and a hydraulic member coupled to the base member and operably attached to the adjustment member, the hydraulic member for actuating movement of the adjustment member to adjust the position of the generator retaining ring relative to the generator rotor.

A first aspect of the invention includes a configuration system for a generator retaining ring, the system having: a set of adjustment apparatuses configured to contact a portion of a generator rotor, each of the set of adjustment apparatuses including: a base member for contacting the portion of the generator rotor; an adjustment member for adjusting a position of the generator retaining ring relative to the generator rotor; and an actuation member coupled to the base member and operably attached to the adjustment member, the actuation member for actuating movement of the adjustment member to adjust the position of the generator retaining ring relative to the generator rotor.

A second aspect of the invention includes a configuration system for a generator retaining ring, the system having: a set of adjustment apparatuses configured to mount to a portion of a generator rotor, each of the set of adjustment apparatuses including: a base member for mounting to the portion of the generator rotor; an adjustment member for adjusting a position of the generator retaining ring relative to the generator rotor; and an actuation member coupled to the base member and operably attached to the adjustment member, the actuation member for actuating movement of the adjustment member to adjust the position of the generator retaining ring relative to the generator rotor; and a control apparatus operably connected to each of the set of adjustment apparatuses, the control apparatus including a control system for providing instructions to the actuation member to actuate movement of the adjustment member.

A third aspect of the invention includes a configuration system for a generator retaining ring, the system having: a set of adjustment apparatuses configured to mount to a portion of a generator rotor, each of the set of adjustment apparatuses including: a base member for mounting to the portion of the generator rotor; an adjustment member for adjusting a position of the generator retaining ring relative to the generator rotor; and a hydraulic member coupled to the base member and operably attached to the adjustment member, the hydraulic member for actuating movement of the adjustment member to adjust the position of the generator retaining ring relative to the generator rotor; and a control apparatus operably connected to each of the set of adjustment apparatuses, the control apparatus including: a control system configured to: provide instructions to the set of adjustment apparatuses, the instructions including commands to progressively adjust the position of the generator retaining ring relative to the generator rotor; determine the position of the generator retaining ring after the adjusting; and iteratively repeat the providing and determining until the position matches a predetermined target position.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
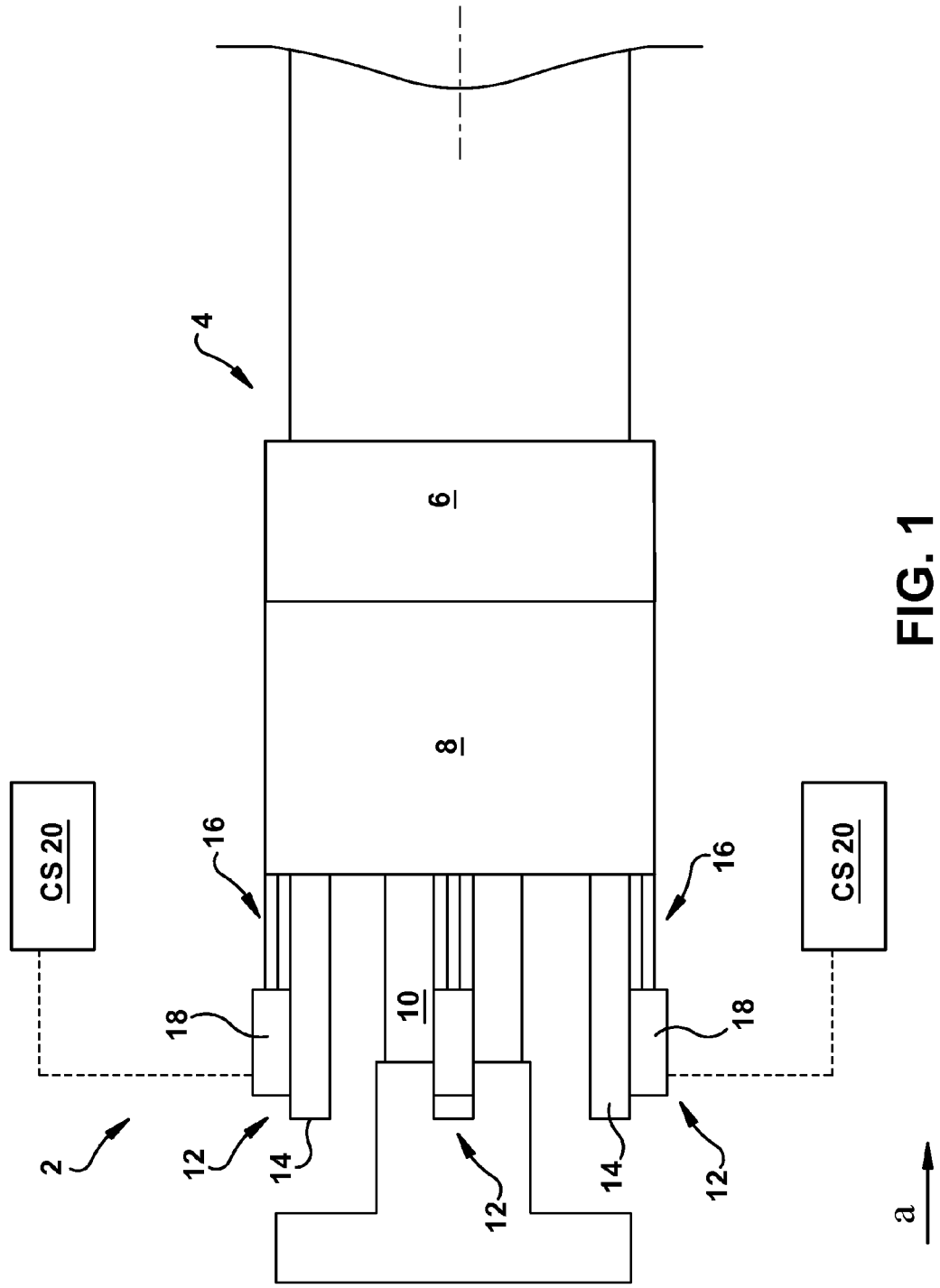
FIG. 1 shows a schematic plan view of a retaining ring configuration system and a corresponding generator rotor according to embodiments of the invention.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The subject matter disclosed herein relates to a retaining ring configuration system for a generator. Specifically, the subject matter disclosed herein relates a configuration system for a generator retaining ring. The system can allow for installation and/or removal of a retaining ring about a portion of an electric generator.

As noted herein, conventionally approaches for aligning a retaining ring around a rotor can include establishing a datum (or, definitive reference point) in order to limit one or more variables in the installation process. In some cases, floor plates and/or track systems are employed to limit movement of the rotor such that a retaining ring can be positioned over the rotor. However, these conventional approaches are insufficient to consistently align the ring with the rotor in the allotted time frame or require costly facility modification and/or installation.

In contrast to these conventional approaches, aspects of the invention provide for a retaining ring configuration system having a hydraulic-based adjustment and measurement apparatus allowing for synchronous and/or independent movement of the ring on the generator rotor. The apparatus can further include at least one load monitoring device and a visual indicator (e.g., a display) allowing for an operator of the apparatus to view and modify (if necessary) the load applied by the hydraulic-based adjustment and measurement apparatus.

In one particular embodiment, the retaining ring configuration system includes a control system (or control pendant) allowing a single operator to manipulate a plurality of hydraulic-based or pneumatic-based adjustment and measurement apparatuses (either independently or synchronously). The control system can allow for manipulation of the hydraulic-based adjustment and measurement apparatuses by the extending/retracting of hydraulic cylinders to allow for adjustment of the pitch and/or yaw of the retaining ring. In some embodiments, the control system can further include a single operating mechanism (e.g., a joystick, roller-ball, or other similar mechanism) for controlling the plurality of hydraulic cylinders.

More specifically, aspects of the invention include a retaining ring configuration/alignment system that uses the rotor body (or a fan ring or coupling ring) as the datum for alignment. This deviates from the pre-aligned configurations and completely free configurations in the art. In one embodiment, aspects of the invention include a retaining ring configuration system having a set of adjustment apparatuses configured to contact (e.g., rest upon or mount to) a portion of a generator rotor. Each of the set of adjustment apparatuses includes: a base member for contacting the portion of the generator rotor; an adjustment member for adjusting a position of the generator retaining ring relative to the generator rotor; and a hydraulic member coupled to the base member and operably attached to the adjustment member. The hydraulic member is configured for actuating movement of the adjustment member to adjust the position of the generator retaining ring relative to the generator rotor.

Turning to FIG. 1, a schematic plan view of a retaining ring configuration system 2 and a corresponding generator rotor 4, is shown according to embodiments of the invention. As shown, the rotor 4 can include a winding section 6, about which a retaining ring 8 will be mounted, and a shaft or spool section 10 connected with the winding section 6. As shown the retaining ring configuration system 2 can include a set of adjustment apparatuses 12 configured to contact (e.g., rest upon or mount to) a portion of the generator rotor 4, particularly, the shaft 10, a fan ring (not shown) or a portion of the winding section 6. In any case, the set of adjustment apparatuses 12 can each include a base member 14 for contacting (e.g., resting upon or mounting to) the portion of the generator rotor 4 (e.g., the shaft 10, winding section 6, or other section). The base member 14 will be further described herein, but in some embodiments base member 14 can include a mountable fixture such as a metal member (e.g., a block or shaft) having one or more coupling mechanisms for mounting to the generator rotor 4. In some cases, the base member 14 can include a substantially rectangular metal member having one or more apertures for coupling to an aperture (e.g., a screw-hole or bolt-hole) in a portion of the rotor 4. In other embodiments, the base member 14 can be designed without apertures or other mounting mechanisms, and can be designed to rest upon a portion of the rotor 4. In either case, the base member 14 can allow the adjustment apparatus 12 to use the rotor 4 as a reference point in adjustment of the retaining ring 8 relative to the rotor 4.

Each adjustment apparatus 12 can further include an adjustment member 16 (not all labeled) for adjusting a position of the generator retaining ring 8 relative to the generator rotor 4. In some cases, the adjustment member 16 can include a substantially cylindrical or rounded portion for contacting an inner diameter of the retaining ring 8. The adjustment member 16 can be positioned radially inside the retaining ring 8 and include a material or coating, at least on its surface contacting the retaining ring 8, that creates traction between the adjustment member 16 and the retaining ring 8. Therefore, as the adjustment member 16 is moved, the retaining ring 8 will move accordingly. Also included in each adjustment apparatus is an actuation member 18 coupled to the base member 14 and operably attached to the adjustment member 16. The actuation member 18 is configured to actuate movement of the adjustment member 16 to adjust the position of the generator retaining ring 8 relative to the generator rotor 6. In some cases, the actuation member 18 is a hydraulic actuation member (or, hydraulic member) including a hydraulic cylinder, and the adjustment member 16 includes a cylinder, shaft, or other member coupled to the hydraulic cylinder. The actuation member 18 can be any conventional hydraulic or pneumatic device that translates the flow of a fluid (e.g., a hydraulic fluid or pneumatic gas) into mechanical (e.g., linear) motion. Additionally, the actuation member 18 can be configured to monitor the flow of the fluid (e.g., hydraulic fluid or gas) and the corresponding linear displacement (e.g., the displacement of the hydraulic cylinder) to determine an actual displacement as it corresponds to an amount of fluid moved. This data may be used (e.g., by control system 20) in the adjustment functions described further herein to provide an accurate feedback loop. In any case, in response to a change in the hydraulic fluid flow in the actuation member 18, the adjustment member 16 (and consequently, the retaining ring 8) can be repositioned to a desired location, and that modified position can be tracked by the actuation member 18 itself (or the control system 20 described further herein).

Also shown connected to one or more of the adjustment apparatuses is a control system 20. It is understood that the control system(s) 20 shown and described herein, in some embodiments, is a single control system 20 that can control a plurality of adjustment apparatuses 12 from a single user interface (not shown). In some embodiments, the single user interface is coupled to the control system, and includes at least one of a graphical user interface, a joystick or a switch, for actuating the hydraulic member 18, and consequently, actuating movement of the adjustment member 16 and the retaining ring 8).

Figure 2:
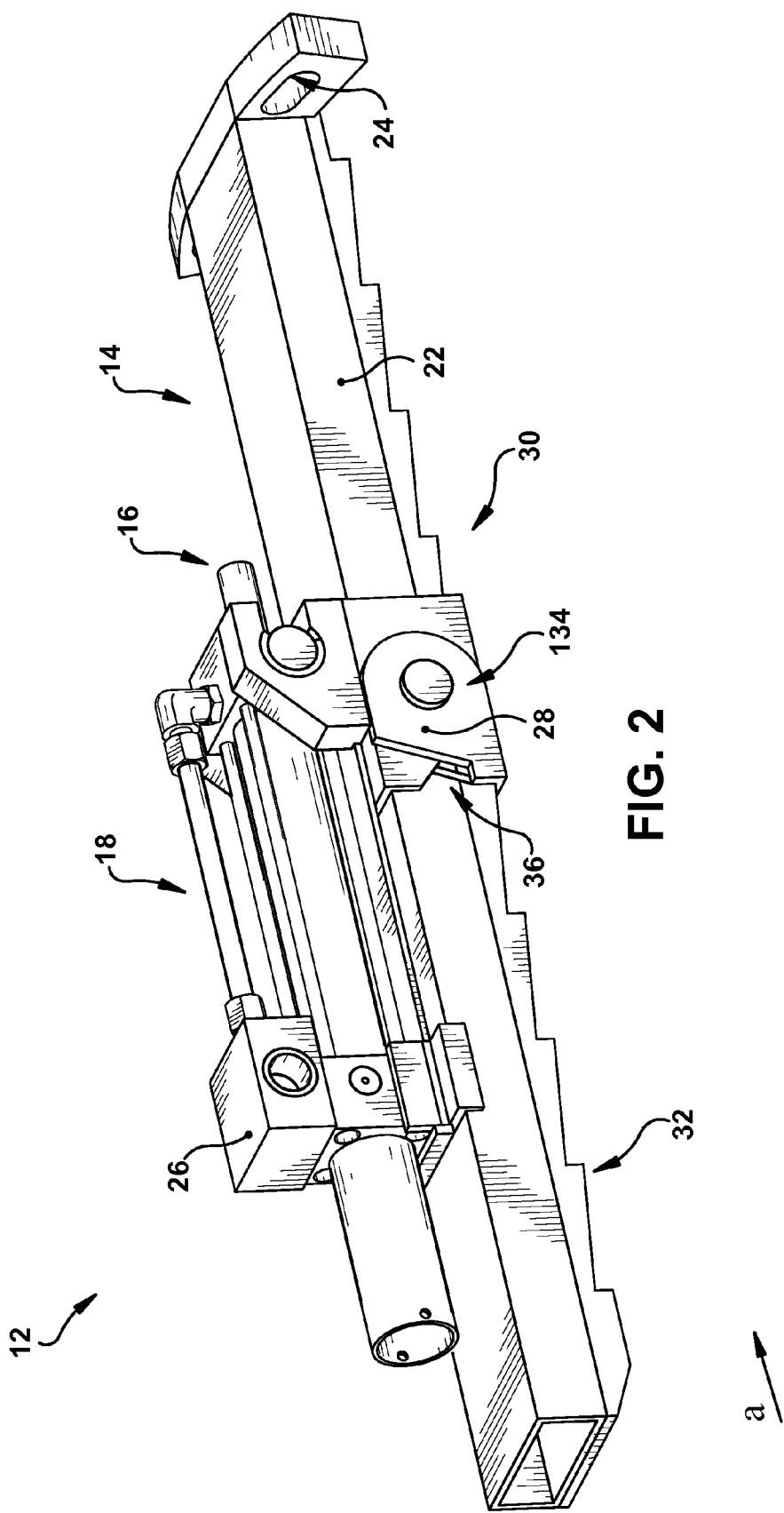
FIG. 2 shows a close-up three-dimensional perspective view of a portion of the adjustment apparatus shown and described with reference to FIG. 1.

FIG. 2 shows a close-up three-dimensional perspective view of a portion of the adjustment apparatus 12 shown and described with reference to FIG. 1. It is understood that similarly numbered elements in the figures may represent substantially similar components. In the embodiment shown, the base member 14 includes a fan ring mounting fixture 22 having apertures 24 for mounting on a fan ring of a rotor (not shown). In some embodiments, the fan ring mounting fixture 22 can be at least partially hollowed-out, however, this is not necessary in all cases. It is understood that the fan ring mounting fixture 22 can be replaced by mounting fixtures more suitable for other portions of the rotor in other embodiments. For example, in other embodiments, the fan ring mounting fixture 22 can be substituted with a fixture capable of contacting (and not necessarily mounting to) the rotor. The base member 14 can also include a hydraulic cylinder mounting fixture 28 in some embodiments (such as where the actuation member 18 is a hydraulic actuation member). The hydraulic cylinder mounting fixture 28 can be configured to mount the actuation member 18 (e.g., the hydraulic cylinder 26) to the base member 14, using one or more nuts, bolts, screws, dovetailed slots, complementary flanges/teeth, etc. The base member can further include a hydraulic member adjustment system 30 for adjusting (e.g., axially) a position of the hydraulic member 18 relative to the base member 14.

In one embodiment, the hydraulic member adjustment system 30 can include a set of teeth, notches, extensions or flanges (teeth) 32 axially disposed along the base member 14. These teeth 32 can be collectively or individually affixed to the base member 14 via any conventional adhesion technique (bolts, screws, adhesives, etc.) or can be formed along with the base member 14. In any case, where the hydraulic member adjustment system 30 includes the set of teeth 32, it can further include a conventional pawl system 34 for traversing the set of teeth 32. The pawl system 34 can include a traditional spring-loaded (spring 36) pawl mechanism configured to traverse the teeth 32 in a lock-step manner, permitting movement in one direction (axially inward) and prohibiting movement in the opposite direction (axially outward).

Also shown, in some embodiments where the actuation member 18 includes a hydraulic member, the actuation member 18 can include a hydraulic cylinder 26 for actuating movement of the adjustment member 16, coupled to an end thereof. The adjustment member 16 can be of any size and length capable of engaging and moving the retaining ring (e.g., retaining ring 8, FIG. 1) over the rotor 4. Not shown in FIG. 2 is the control system 20, which can be operably connected to the hydraulic member 18 and/or the base member 14 in any number of manners. For example, the control system 20 can include an electrical control system connected via wireless and/or hard-wired means with the actuation member 18, or the control system 20 can include an electro-mechanical control system for physically actuating the actuation member 18 (e.g., via hydraulic cylinder 26). The control system 20 can include one or more hydraulic fluid sources, including pumps, valves, and measurement devices, for actuating movement of the hydraulic cylinder 26 by passing hydraulic fluid therethrough. In some cases, the control system 20 can be coupled (separately or in series) to a plurality of adjustment apparatuses 12 and can actuate the plurality of apparatuses 12 separately or collectively.

Figure 3:
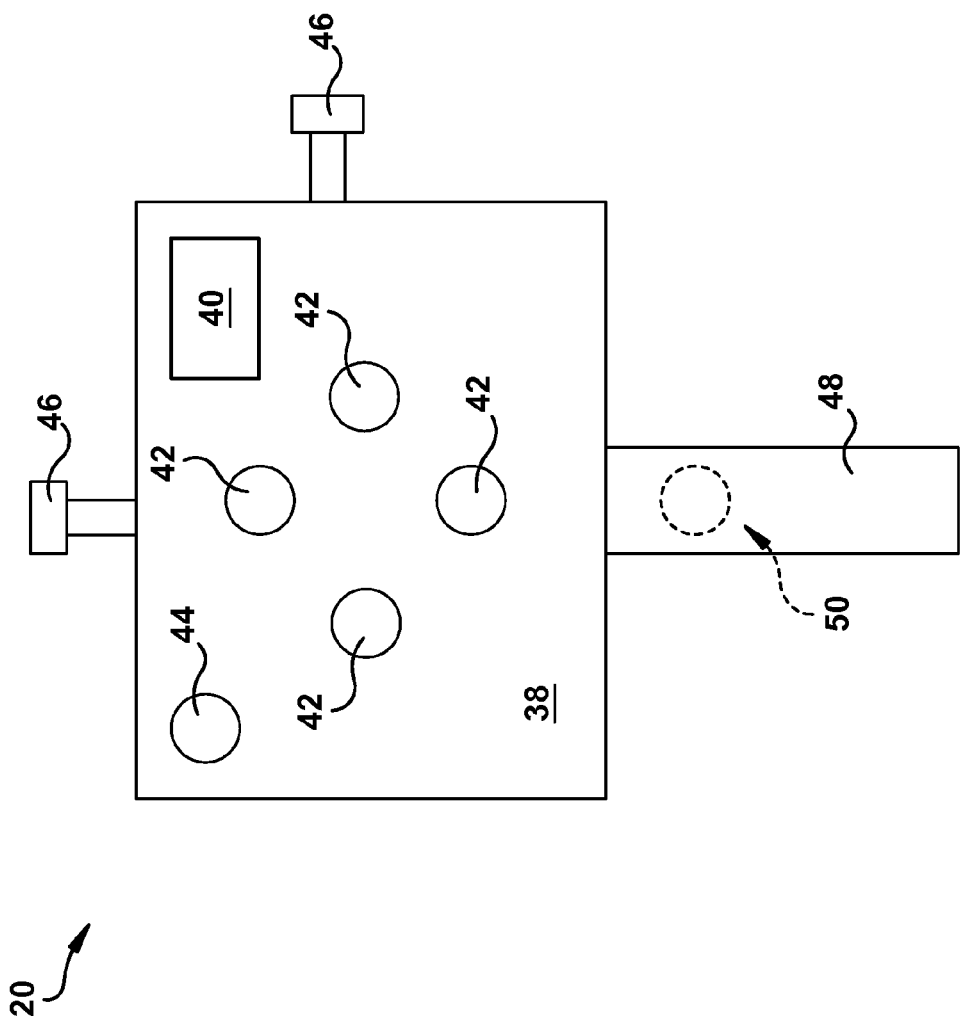
FIG. 3 shows a schematic depiction of a control system according to embodiments of the invention.

FIG. 3 shows a schematic depiction of a control system 20 according to embodiments of the invention. The control system 20 can include a single user interface configured to provide control of a set of adjustment apparatuses (e.g., adjustment apparatuses 12, not shown) from the single user interface. As shown, the control system 20 can include a face 38 having at least one display 40 (e.g., a graphical user interface or other display) and a plurality of switches (e.g., toggle switches) 42. Also shown is a mode selection switch 44, which can be located on the face 38 in some embodiments. Additionally, yaw and pitch controllers 46 (e.g., joysticks) are shown located on sides of the control system 20, however, these controllers 46 could be located anywhere on the control system 20. Also shown, the control system 20 can include a handle 48, where the control system 20 can be a hand-held device operable by a single human operator. In this case, the control system 20 can include a traditional "dead-man" switch or trigger 50 for preventing movement of the adjustment apparatuses 12 when the user is not actuating the switch 50.

It is understood that the control system 20 can allow a human operator to control a plurality (or, set) of adjustment apparatuses 12 radially disposed about a generator rotor (e.g., rotor 4, FIG. 1) via a single user interface. The control system 20 can allow the human operator to perform the functions currently performed by several human operators (e.g., up to 8 at a time) when installing generator retaining rings over an electrical generator. Additionally, the feedback of data from the hydraulic member 18 to the control system 20 allows for the control system 20 to continuously monitor a position of the retaining ring 8 (via knowledge of the adjustment member 16), and iteratively repeat adjustment of the retaining ring 8 via the adjustment apparatuses 12. This allows the operator to make contemporaneous (and repeatable) adjustments to the position of the retaining ring 8 (via the adjustment apparatuses 12), thereby allowing for installation within the relatively short time window.

In some cases, the control system 20 is configured to perform the following: provide instructions to the set of adjustment apparatuses 12, the instructions including commands to progressively adjust the position of the generator retaining ring 8 relative to the generator rotor 4; determine the position of the generator retaining ring 8 after the adjusting; and iteratively repeat the providing and determining until the position of the retaining ring 8 matches a predetermined target position. In any case, the technical effect of the control system 20 is to provide instructions to one or more adjustment apparatuses 12 to modify a position of a generator retaining ring 8 relative to a generator rotor 4.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A configuration system for a generator retaining ring, the system comprising:
   a set of adjustment apparatuses configured to contact a portion of a generator rotor, each adjustment apparatus in the set of adjustment apparatuses including:
   a base member for contacting the portion of the generator rotor;
   an adjustment member for adjusting a position of the generator retaining ring relative to the generator rotor; and
   an actuation member coupled to the base member and operably attached to the adjustment member, the actuation member for actuating movement of the adjustment member to adjust the position of the generator retaining ring relative to the generator rotor, wherein the actuation member includes a hydraulic member, wherein the base member further includes a hydraulic member adjustment system for axially adjusting a position of the hydraulic member relative to the base member, wherein the hydraulic member adjustment system further includes a set of teeth or notches axially disposed along the base member.

2. The configuration system of claim 1, further comprising: a control system operably connected to each of the set of adjustment apparatuses.

3. The configuration system of claim 2, the control system configured to provide instructions to the hydraulic member to actuate movement of the adjustment member.

4. The configuration system of claim 1, wherein the base member is further configured to mount to one of a rotor center ring, a rotor face or a rotor fan ring.

5. The configuration system of claim 1, wherein the hydraulic member includes a hydraulic cylinder and a hydraulic cylinder mounting fixture, the hydraulic cylinder mounting fixture coupling the hydraulic cylinder to the base member.

6. The configuration system of claim 1, wherein the hydraulic member adjustment system includes a pawl system for traversing the set of teeth or notches.

7. A configuration system for a generator retaining ring, the system comprising:
a set of adjustment apparatuses configured to mount to a portion of a generator rotor, each adjustment apparatus in the set of adjustment apparatuses including:
a base member for mounting to the portion of the generator rotor;
an adjustment member for adjusting a position of the generator retaining ring relative to the generator rotor; and
an actuation member coupled to the base member and operably attached to the adjustment member, the actuation member for actuating movement of the adjustment member to adjust the position of the generator retaining ring relative to the generator rotor, wherein the actuation member includes a hydraulic member,
wherein the base member further includes a hydraulic member adjustment system for axially adjusting a position of the hydraulic member relative to the base member, wherein the hydraulic member adjustment system further includes a set of teeth or notches axially disposed along the base member; and
a control apparatus operably connected to each of the set of adjustment apparatuses, the control apparatus including a control system for providing instructions to the actuation member to actuate movement of the adjustment member.

8. The configuration system of claim 7, wherein the control apparatus includes a single user interface providing control of the set of adjustment apparatuses from the single user interface.

9. The configuration system of claim 7, wherein the control system is configured to provide instructions to modify at least one of: a yaw of the generator retaining ring, a pitch of the generator retaining ring or a roll of the generator retaining ring.

10. The configuration system of claim 7, wherein the control apparatus includes at least one switch or joystick for initiating the providing of the instructions to the actuation member.

11. The configuration system of claim 7, wherein the base member is configured to mount to one of a rotor center ring, a rotor face or a rotor fan ring.

12. The configuration system of claim 7, wherein the hydraulic member includes a hydraulic cylinder and a hydraulic cylinder mounting fixture, the hydraulic cylinder mounting fixture coupling the hydraulic cylinder to the base member.

13. The configuration system of claim 7, wherein the hydraulic member adjustment system includes a pawl system for traversing the set of teeth or notches.

14. A configuration system for a generator retaining ring, the system comprising:
a set of adjustment apparatuses configured to mount to a portion of a generator rotor, each adjustment apparatus in the set of adjustment apparatuses including:
a base member for mounting to the portion of the generator rotor;
an adjustment member for adjusting a position of the generator retaining ring relative to the generator rotor; and
a hydraulic member coupled to the base member and operably attached to the adjustment member, the hydraulic member for actuating movement of the adjustment member to adjust the position of the generator retaining ring relative to the generator rotor,
wherein the base member further includes a hydraulic member adjustment system for axially adjusting a position of the hydraulic member relative to the base member, wherein the hydraulic member adjustment system further includes a set of teeth or notches axially disposed along the base member; and
a control apparatus operably connected to each of the set of adjustment apparatuses, the control apparatus including:
a control system configured to:
provide instructions to the set of adjustment apparatuses, the instructions including commands to progressively adjust the position of the generator retaining ring relative to the generator rotor;
determine the position of the generator retaining ring after the adjusting; and
iteratively repeat the providing and determining until the position matches a predetermined target position.

* * * * *

UNITED STATES PATENT AND TRADEMARK OFFICE
CERTIFICATE OF CORRECTION

| | | |
|---|---|---|
| PATENT NO. | : 8,907,539 B2 | Page 1 of 1 |
| APPLICATION NO. | : 13/218841 | |
| DATED | : December 9, 2014 | |
| INVENTOR(S) | : Wang et al. | |

It is certified that error appears in the above-identified patent and that said Letters Patent is hereby corrected as shown below:

IN THE DRAWINGS

In Fig. 2, Sheet 2 of 3, delete "134" and insert -- 34 --, therefor.

IN THE SPECIFICATION

In Column 4, Line 21, delete "rotor 6." and insert -- rotor 4. --, therefor.

Signed and Sealed this
Eighth Day of March, 2016

Michelle K. Lee
*Director of the United States Patent and Trademark Office*